United States Patent [19]

Morival et al.

[11] Patent Number: 4,786,673
[45] Date of Patent: Nov. 22, 1988

[54] FLAME RETARDED POLYAMIDES

[75] Inventors: Genevieve Morival, Serquigny; Catherine Hervy, Bernay, both of France

[73] Assignee: Atochem, France

[21] Appl. No.: 149,978

[22] Filed: Jan. 26, 1988

Related U.S. Application Data

[63] Continuation of Ser. No. 833,411, Feb. 19, 1986, abandoned, which is a continuation of Ser. No. 731,552, May 7, 1985, abandoned.

[30] Foreign Application Priority Data

May 21, 1984 [FR] France ................ 84 07879

[51] Int. Cl.$^4$ ................ C08K 5/34
[52] U.S. Cl. ................ 524/101
[58] Field of Search ........... 524/101, 102, 387, 414, 524/417; 528/313, 336

[56] References Cited

U.S. PATENT DOCUMENTS

| | | | |
|---|---|---|---|
| 2,640,044 | 5/1953 | Stamatoff | 524/414 |
| 2,755,260 | 7/1956 | Stilbert | 523/179 |
| 3,228,898 | 1/1966 | Illing et al. | 524/417 |
| 3,575,939 | 4/1971 | Kochnar et al. | 524/101 |
| 3,635,970 | 1/1972 | Fessler et al. | 252/606 |
| 3,779,998 | 12/1973 | Hermann | 528/313 |
| 3,840,500 | 10/1974 | Ryffel et al. | 528/313 |
| 3,936,416 | 2/1976 | Brady | 524/387 |
| 3,980,616 | 9/1976 | Kimura et al. | 524/101 |
| 4,001,177 | 1/1977 | Isutsumi et al. | 524/101 |
| 4,180,496 | 12/1979 | Yanagimoto et al. | 524/101 |
| 4,198,493 | 4/1980 | Marciandi | 524/101 |
| 4,201,705 | 5/1980 | Halpern et al. | 523/179 |
| 4,317,766 | 3/1982 | Kawasaki et al. | 524/101 |
| 4,321,189 | 3/1982 | Oshita et al. | 524/101 |
| 4,336,184 | 6/1982 | Halpern | 523/179 |
| 4,511,684 | 4/1985 | Schmid | 524/102 |

FOREIGN PATENT DOCUMENTS 2139364 9/1984 Fed. Rep. of Germany.

OTHER PUBLICATIONS

H. L. Vandersall—J. Fire and Flammability—vol. 2, pp. 129-140, Apr. 1971.

Primary Examiner—Veronica P. Hoke
Attorney, Agent, or Firm—Brooks Haidt Haffner & Delahunty

[57] ABSTRACT

Flame retarded polyamides and methods for their preparation, the polyamides being obtained by anionic polymerization of lactams or by the hydrolytic polycondensation of monomers in the presence of chain terminators, the flame resistance being conferred by incorporating into the molten polyamide a mixture of melamine cyanurate and a polyol having at least four hydroxy groups.

14 Claims, No Drawings

FLAME RETARDED POLYAMIDES

This application is a continuation of application Ser. No. 833,411 filed Feb. 19, 1986, now abandoned, which is a continuation of application Ser. No. 731,552 filed May 7, 1985 now abandoned.

BACKGROUND OF THE INVENTION

The present invention relates to polyamide-based compositions, and more particularly, it relates to flame retarded polyamides prepared by adding melamine cyanurate and a polyol to the polyamides.

Polyamides have numerous uses because of their outstanding physical properties. Notwithstanding all this, in certain special areas, including among others the automobile, aerospace, and electrical industries, the use of polyamides has been limited by their excessive combustibility. To cure this problem, numerous solutions have already been proposed, but none of these has been found to be entirely satisfactory in practice.

Further, the customary fire retardant additives based on organic halogen derivatives, such as, for example, decabromodiphenyl ether, alone or in combination with antimony oxide, are producers of halogen acids which are released during fabrication or during the use of polyamides containing them. This results in corrosion risks to equipment and to environmental damage.

Phosphorus which has also been suggested, for example, in U.S. Pat. No. 3,778,407, is not easy to use and also causes a reddish tint in the polyamides to which it is added.

Some substantial progress has been made through the use of melamine cyanurate, as shown in French Patent documents Nos. 7923111 and 8204446 and European Pat. No. 0019768, but these compositions are not as effective on a weight basis as certain compounds with a high chlorine or bromine content.

On the other hand, it must not be lost sight of that even if the additives mentioned above reduce the combustion tendencies of the plastic materials in which they are incorporated, this tendency being measured by the Oxygen Index limit, according to French standard NFT 51.071 or ASTM D 2863, these prior art additives have no effect on the tendency to drip. This characteristic is also required of the above-cited materials by ASTM standard D 635 and by combustion test UL 94 described in Bulletin 94 of the Underwriters Laboratories.

THE INVENTION

It has been found according to the present invention that the combustibility and the dripping of polyamides can be reduced by the joint incorporation of melamine cyanurate and a polyol having at least four alcohol functions. The combined melamine cyanurate-polyol is effective on pure polyamides or on those loaded with the usual adjuvants such as coloring agents, heat stabilizers, anti-ultraviolet compounds, and the like, but further, and more surprisingly, on plasticized grades containing, among other plasticizers, butylbenzene sulfonamide, para-hydroxyoctyl benzoate, or their mixture. There is equally seen an improvement for the grades loaded with fillers, such as, for example, talc, glass fibers, carbon fibers, and the like.

The flame retraded polyamide compositions according to the present invention desirably contain at least 35 percent by weight of polyamide, from 0 to 30 percent by weight of additives, fillers, and/or plasticizers, from 1 to 25 weight percent of melamine cyanurate, and from 0.5 to 10 weight percent of polyols, the total quantity of these constituents in each case equaling 100 percent.

As used herein, melamine cyanurate includes compositions resulting from the action of melamine on cyanuric acid, and in certain preferred embodiments, the compositions resulting from the equimolar reaction of the melamine and the cynauric acid. The cyanuric acid can be in the enol or keto form.

Various manufacturers sell such compositions under the name "melamine cyanurate". It is important to establish by research or by preliminary tests that these have the most appropriate particle size as well as the best ability to be dispersed in the polyamides. This can easily be established by examining sections with a microscope. So far as appropriate particle size is concerned, in certain preferred embodiments of this invention, the best results are obtained when about 70 percent of the cyanurate particles utilized are equal to or less than 30 microns in size.

The polyols containing at least four alcohol functions, or hydroxy groups, include tetrols such as erythritol, monopentaerythritol and its derivatives such as the di- and tripentaerythritols, and the like; the pentols such as xylitol, arabitol, and the like; and the hexols such as mannitol, sorbitol, and their higher homologues. It will be understood by those skilled in the art from the present description that the aforesaid polyols can be used alone or in mixtures of two or more such polyols.

It is particularly desirable in the practice of this invention to use monopentaerythritol and sorbitol. These, like the melamine cyanurate, should have an appropriate particle size to enable good dispersion in the polyamides. It has been found that commercial products having a particle size distribution such that 90 percent are less than 10 microns can be easily used without difficulty in the practice of the invention.

The pentaerythritols had already been mentioned as constituents in intumescent compositions in U.S. Pat. Nos. 3,810,862; 3,931,081 and 3,936,416, but these had reference only to polyolefins. What is very unexpected is that these pentaerythritols act in synergy with the melamine cyanurate on the polyamides in the manner indicated above.

The polyamides contemplated herein include polymers essentially obtained by the anionic polymerization of one or more lactams, such as caprolactam, oenantholactam, lauryllactam, and the like; or by hydrolytic polycondensation, either of the aforesaid lactams, or of one or more amino acids such as aminocaproic acid, 7-aminoheptanoic acid, 11-aminoundecanoic acid, 12-aminododecanoic acid, and the like, or of one or more salts or mixtures of diamines such as hexamethylene diamine, dodecamethylene diamine, meta-xylylene diamine, bis-para-aminocyclohexylmethane, trimethylhexamethylene diamine, and the like, with dicarboxylic acids such as isophthalic acid, terephthalic acid, adipic acid, azelaic acid, suberic acid, sebacic acid, dodecane dicarboxylic acid, and the like; or by mixtures of two or more of such monomers to produce copolyamides. The term "polyamides" likewise will be understood to include the polyether amides and polyether ester amides.

The efficacy of the melamine cyanurate-polyol combination depends on the nature of the polyamides to be flame-retarded. This involves various factors, the monomer or monomers from which the polyamide is made, the manner in which the polyamide has been prepared, and the molecular weight of the polyamide.

Concerning the first point, polyamide-6, derived from caprolactam, and polyamide-66, from hexamethylene diamine adipate, naturally have, perhaps due to their higher nitrogen content, a lesser tendency to burn than polyamides-11 and -12.

Thus, to obtain the same result, let us say an O.I. (Oxygen Index limit) greater than 33 according to NFT Standard 51.071 and a VO classification, at 1.6 and 3.2 mm thicknesses, according to UL Standard 94, it is necessary to incorporate a greater quantity of melamine cyanurate-pentaerythritol mixture in polyamides-11 and -12 than is required for polyamides-6 and -66.

As to the second point, it has been unexpectedly and suprisingly found that the sort of additives utilized during the preparation of the polyamide plays an important role in the ability of the polyamide to have its fire resistance improved by the melamine cyanurate and the polyol.

It is to be recalled that when a polyamide is prepared by hydrolytic polycondensation of its monomer, this polycondensation is most usually carried out in the presence of an additive which can be an acid, such as acetic acid, adipic acid, sebacic acid, dodecandioic acid, phosphoric acid, and the like, or a base, such as sodium carbonate, potassium carbonate, hexamethylene diamine, and the like, this additive having for effect to hydrolyze the monomer when it is a lactam, and sometimes to accelerate the polycondensation, or in all cases, to limit the molecular weight. For this last reason, the additive is herein denominated a chain limiter.

It has been found according to this invention that for compositions comprised of certain polyamides, that is, those resulting from the polycondensation of their monomers in the presence of an acid derived from phosphorus or a mono- or dicarboxylic organic acid having at least eight carbon atoms, such as, for example among others, pelargonic acid, azelaic acid, dodecanedioic acid (decane dicarboxylic acid), and the like, the melamine cyanuratepolyol mixture provides flammability test results significantly greater than for those compositions comprised of the same polyamides (the same monomer and the same molecular weight), but obtained in the presence of an other chain limiter such as adipic acid, for example, and with the same quantity of melamine cyanurate and polyol.

The term "an acid derived from phosphorus" includes orthophosphoric acid, metaphosphoric acid, pyrophosphoric acid, phosphorous acid, or hypophosphorous acid, and the like. The phosphorus acid essentially functions to accelerate the polycondensation reaction while limiting the molecular weight of the final polymer, such as for example, is stated among other references in French Pat. Nos. 951,924 and 1,401,842, and Application No. 70-3855 (Publicat. No. 2,110,661). It is also known that such acids cause the hydrolytic splitting of some lactams if they are used with such monomers).

For a given amount of melamine cyanurate and polyol, the higher the phosphoric acid content of the polyamide, the lesser the flammability. Thus a polyamide-11 to be injectionmolded and having a relatively low molecular weight (as determined by the inherent viscosity, measured at 25° C. in meta-cresol at a concentration of 0.5 g per 100 g, and equal to or greater than 0.90) obtained by the polycondensation of 11-aminoundecanoic acid, in the presence of ten parts per thousand of orthophosphoric acid, will have a better performance than a polyamide to be used for extrusion having a relatively higher molecular weight (an inherent viscosity equal to or greater than 1.20) obtained by the polycondensation of the same monomer in the presence of only five parts per thousand of orthophosphoric acid. In this case, the poorer extrusion qualities can be compensated for by increasing the amounts of cyanurate and polyol.

One aspect of the present invention comprises obtaining compositions with good fire resistance by utilizing those polyamides which by their nature do not lend themselves to nonflammability, such as polyamide-11 and -12 from adipic acid, for example, or polyamide-11 and -12 containing very little acid derived from phosphorus. This embodiment of the invention involves enriching these compositions in acid derived from phosphorus, for example, by adding such acid to the polyamides when they are in the molten state at the same time that the melamine cyanurate and polyol are added. It has thus been found that to obtain such compositions with an O.I. equal to or greater than 31, a value which was otherwise unattainable, these compositions must be so enriched with such acid derived from phosphorus that the final composition contains from two to 20 parts per thousand of such acid, calculated as orthophosphoric acid with respect to the weight of polyamide.

Incorporation of the melamine cyanurate and the polyol is carried out by mixing these two materials in a finely divided state into the molten polyamide. Any mixer assuring a good dispersion of material can be used. Particularly useful in the practice of this invention are twin screw extruders such as the Werner and Pfleiderer and the Buss type mixers.

One simple way of operating comprises dry mixing the polyamide granules, the cyanurate and the polyol and feeding this mixture to a twin screw extruder. It is equally satisfactory to continuously feed an extruder with, on the one hand, the polyamide granules and, on the other hand, a mixture prepared in advance by dry blending cyanurate with polyol. Further, a master batch of polyamide, cyanurate, and polyol can be prepared for later mixing with the polyamide.

In another embodiment, the melamine cyanurate is first blended with the polyamide by passage through an extruder, followed by refeeding this product to the same extruder with the addition of the polyol.

All parts, percentages, proportions, and ratios herein are by weight, unless otherwise indicated.

The following Examples are given to illustrate embodiments of the invention as it is presently preferred to practice it. It will be understood that these Examples are illustrative, and the invention is not to be considered as restricted thereto except as indicated in the appended claims.

It is noted that the inherent viscosity of the polyamides which will be shown in the following Examples is measured at 25° C. in an m-cresol solution of 0.5 g polyamide per 100 g of cresol.

The results obtained in the various Examples are shown in Table I.

Series A—Adipic polyamide-11 for injection

A stainless steel autoclave is charged with 11-aminoundecanoic acid and 5 parts per thousand of its weight of adipic acid and water. After bringing the temperature to 180° C., the vents being closed, the vapor pressure of the water reaches 10 bars. The pressure is reduced to atmospheric, the temperature is maintained at 250° C., and the reactor is swept with a gentle stream of nitrogen, thus eliminating the water vapor generated by the polycondensations, for the time necessary to obtain a polymer having an inherent viscosity equal to 1.05 which is extruded out of the autoclave by increasing the nitrogen pressure in the form of strands which are solidified by cooling with water. The strands are thereafter cut into granules and the granules are dried.

Series B—Phosphoric polyamide-11 for injection

A polymer is prepared as in Series A by charging the autoclave with water and 11-aminoundecanoic acid, but with 8.5 parts per thousand of orthophosphoric acid by weight of the aminoundecanoic acid. Because of the catalyst action of the phosphoric acid, it is not necessary to carry out the polycondensation at 250° C. for as long in Series A to obtain a polymer with a viscosity of 1.05.

Series C—Adipic polyamide-12 for injection

The same autoclave used in the previous series is charged with 30,000 parts by weight of lauryllactam, 300 parts of water, and 150 parts of adipic acid. The temperature is raised to 280° C. and maintained there for five hours under a pressure of 25-30 bars.

The temperature is allowed to fall to 250° C. and the polycondensation is continued at 250° C. and atmospheric pressure with a gentle stream of nitrogen for the time necessary to obtain a polyamide with a viscosity equal to 1.10.

Series D—Phosphoric polyamide-12 for injection

As in Series C, the autoclave is charged with 30,000 parts of lauryllactam and 3000 parts of water, but with 255 parts of orthophosphoric acid (a ratio of 8.5 parts per thousand). This is kept under pressure at 280° C. for only two hours. The polycondensation is carried out for the time required to obtain a polyamide with a viscosity of 1.02.

Series E—Dodecanedioic polyamide-12 for injection

The polymer is prepared by operating as in Series C with 30,000 parts of lauryllactam, 3000 parts of water and 261 parts of dodecanedioic acid (decane dicarboxylic acid 1-10). The polycondensation is carried out to obtain a polymer having an inherent viscosity of 1.00.

The granules of polyamides A, B, C, D, and E are used to injection mold specimens for the following tests:

The Oxygen Index limit according to NFT 51-071;

The combustibility according to Underwriters Laboratories Publication UL 94, as shown in Examples I, VI, XII, XVIII, and XXIV, in Table I.

Further, compositions containing melamine cyanurate or monopentaerythritol (or sorbitol) or these two materials are prepared from these polyamides. In all of these tests, the melamine cyanurate used is from the Austrian company Chemie Linz A.G. It has 70 percent of particles with a diameter in the neighborhood of 25 microns and the formula $C_3H_6N_6 \cdot C_3H_3N_3O_3$; the monopentaerythritol, from Celanese; the sorbitol, from the French company Lambert-Riviere sold under the name Sorbitol E 420 Neosorb powder.

All of these compositions are prepared according to the same operating conditions, described for Example IV as follows:

A Buss mixer is continuously fed on the one hand, using a Soder type S 200 spiral screw feeder, with adipic polyamide-11 granules obtained as in Series A, and on the other hand, using a Soder Type T 20 twin screw feeder, with a mixture previously made in a Henschell high speed type mixer of 10 kg of melamine cyanurate and 2 kg of monopentaerythritol. Adjustments are such that 88 kg of polyamide is used for 12 kg of the foregoing melamine cyanurate-monopentaerythritol mixture.

The temperature of the mixer is adjusted to the neighborhood of 235° C. The material leaves the machine, which is fitted with a multiple strand die, in the form of strands which are cooled with water and cut into granules. The combustibility tests mentioned above are carried out on injection molded samples of the aforesaid suitably dried granules.

EXAMPLE XVII

Introduction of Phosphoric Acid During Extrusion

A Buss mixer is fed on the one hand with a previously prepared mixture of 8120 parts of granules of the polyamide-12 with five per thousand adipic acid obtained in Series C and 85 parts of orthophosphoric acid, and on the other hand, with a mixture of 1500 parts of melamine cyanurate and 295 parts of monopentaerythritol. The extruded strands are cooled and cut into granules which permit injection molding of the requisite samples for combustibility tests.

The results of these tests are set forth in Table I which clearly demonstrates that:

1. The addition of melamine cyanurate alone as shown in Examples II, III, VII, VIII, XIII, XIV, XIX, XX, and XV only provides limited success in reducing flammability. Only a few points are gained in the Oxygen Index limit, and the UL classification always remains at V2.

2. The addition of monopentaerythritol alone, as shown in Examples IX, X, XXI, and XXII, does not provide any improvement.

3. By contrast, the joint addition of cyanurate and monopentaerythritol clearly improves the performance in a general way as shown in Examples V and XVI. These improvements are considerable, with an O.I. limit greater than 31 and a UL classification of VO at 3.2 mm thickness, when the compositions contain phosphoric acid, either because the polyamides used already contained phosphoric acid, as shown in Examples XI and XXIII, or because phosphoric acid is added, as in Example XVII, or when the compositions contain dodecanedioic acid, as shown in Examples XXVI and XXVII.

4. The combined use of sorbitol with the cyanurate considerably improves the O.I. limit, as shown in Example XXVIII.

TABLE I

| | COMPOSITION OF MIXTURE, PARTS BY WEIGHT | | | | | | FLAMMABILITY TEST RESULTS UL 94 CLASSIFICATION | | |
|---|---|---|---|---|---|---|---|---|---|
| | POLYAMIDE | | Melamine | EXTRUSION ADJUVANTS POLYOL | | Orthophos- | Oxygen | Sample thickness | |
| EXAMPLE | Type | Parts | Cyanurate | Type | Parts | phoric acid | Index | 0.8 mm | 1.6 mm | 3.2 mm |
| I | Adipic Polyamide 11 (A) | 100 | 0 | Monopentaerythritol | 0 | 0 | 23 | | v2 | v2 |
| II | Adipic Polyamide 11 (A) | 90 | 10 | Monopentaerythritol | 0 | 0 | 25 | | v2 | v2 |
| III | Adipic Polyamide 11 (A) | 80 | 20 | Monopentaerythritol | 0 | 0 | 26 | | v2 | v2 |
| IV | Adipic Polyamide 11 (A) | 88 | 10 | Monopentaerythritol | 2 | 0 | 26 | | v2 | v2 |
| V | Adipic Polyamide 11 (A) | 76 | 20 | Monopentaerythritol | 4 | 4 | 27 | | v2 | v2 |
| VI | Phosphoric Polyamide 11 (B) | 100 | 0 | Monopentaerythritol | 0 | 0 | 25 | | v2 | v2 |
| VII | Phosphoric Polyamide 11 (B) | 90 | 10 | Monopentaerythritol | 0 | 0 | 26 | | v2 | v2 |
| VIII | Phosphoric Polyamide 11 (B) | 80 | 20 | Monopentaerythritol | 0 | 0 | 27 | | v2 | v2 |
| IX | Phosphoric Polyamide 11 (B) | 98 | 0 | Monopentaerythritol | 2 | 0 | 25 | | v2 | v2 |
| X | Phosphoric Polyamide 11 (B) | 96 | 0 | Monopentaerythritol | 4 | 0 | 25 | | v2 | v2 |
| XI | Phosphoric Polyamide 11 (B) | 88 | 10 | Monopentaertritol | 2 | 0 | 34 | v0 | v0 | v0 |
| XII | Adipic Polyamide 12 (C) | 100 | 0 | Monopentaerythritol | 0 | 0 | 21 | | v2 | v2 |
| XIII | Adipic Polyamide 12 (C) | 90 | 10 | Monopentaerythritol | 0 | 0 | 25 | | v2 | v2 |
| XIV | Adipic Polyamide 12 (C) | 80 | 20 | Monopentaerythritol | 0 | 0 | 28 | | v2 | v2 |
| XV | Adipic Polyamide 12 (C) | 88 | 10 | Monopentaerythritol | 2 | 0 | 28 | | v2 | v2 |
| XVI | Adipic Polyamide 12 (C) | 76 | 20 | Monopentaerythritol | 4 | 0 | 29 | | v2 | v2 |
| XVII | Adipic Polyamide 12 (C) | 81.2 | 15 | Monopentaerythritol | 2.95 | 0.85 | 31.9 | v2 | v0 | v0 |
| XVIII | Phosophoric Polyamide 12 (D) | 100 | 0 | Monopentaerythritol | 0 | 0 | 22 | | v2 | v2 |
| XIX | Phosphoric Polyamide 12 (D) | 90 | 10 | Monopentaerythritol | 0 | 0 | 25 | | v2 | v2 |
| XX | Phosphoric Polyamide 12 (D) | 75 | 25 | Monopentaerythritol | 0 | 0 | 26 | | v2 | v2 |
| XXI | Phosphoric Polyamide 12 (D) | 98 | 0 | Monopentaerythritol | 2 | 0 | 22 | | v2 | v2 |
| XXII | Phosphoric Polyamide 12 (D) | 96 | 0 | Monopentaerythritol | 4 | 0 | 22 | | v2 | v2 |
| XXIII | Phosphoric Polyamide 12 (D) | 82 | 15 | Monophentaerythritol | 3 | 0 | 35 | v2 | v0 | v0 |
| XXIV | Dodecanedioic Polyamide 12 (E) | 100 | 0 | Monopentaerythritol | 0 | 0 | 22 | | v2 | v2 |
| XXV | Dodecanedioic Polyamide 12 (E) | 80 | 20 | Monopentaerythritol | 0 | 0 | 29 | | v2 | v2 |
| XXVI | Dodecanedioic Polyamide 12 (E) | 80 | 17 | Monopentaerythritol | 3 | 0 | 33 | v0 | v0 | v0 |
| XXVII | Dodecanedioic Polyamide 12 (E) | 82 | 15 | Monopentaerythritol | 3 | 0 | 31 | v0 | v0 | v0 |
| XXVIII | Phosphoric Polyamide 11 (B) | 83 | 15 | Sorbitol | 2 | 0 | 30.6 | | v2 | v2 |

EXAMPLE XXIX

Preparation of Plasticized and Flameproofed Polyamide-11

A Werner ZDSK 53 extruder is fed on the one hand with 7000 parts of polyamide-11 granules obtained as in Series B, but with five parts per thousand of othophosphoric acid, instead of 8.5 parts, and with an inherent viscosity of 1.55, and on the other hand, with a previously prepared mixture of 1500 parts of melamine cyanurate, 300 parts of monopentaerythritol, 100 parts of Irganox 1010 and 50 parts of Tinuvin P, these two latter Ciba-Geigy products being designed to protect the composition against aging. Using a feed pump, 1200 parts of butylbenzene sulfonamide is simultaneously introduced into the mixture melted at 240° C., at the third conduit level.

The extruded strands are cooled and cut into granules which permit injection molding of the required samples for flammability tests. The Oxygen Index limit is 25. Without the cyanurate or the pentaeyrthritol, the index is 21. The product is classified by VO by UL test 94 at 3.2 mm thickness. Without the flameproofing according to the present invention, the specimens burn completely.

What is claimed is:
1. Flame retarded polyamides with reduced dripping properties comprising a polyamide and an amount of (1) melamine cyanurate and (2) a polyol having at least four hydroxy groups, dispersed in the polyamide to retard combustion in the polyamide.

2. A flame retarded polyamide according to claim 1 wherein the polyamide is derived from the anionic polymerization of lactams or from the hydrolytic condensation of monomers in the presence of a chain-limiter.

3. A flame retarded polyamide according to claim 1 containing at least 35 percent by weight of the polyamide, from 0 to 30 percent by weight of at least one additive, filler, or plasticizer, from 1 to 25 percent by weight of the melamine cyanurate, and from 0.5 to 10 percent by weight of the polyol.

4. A flame retarded polyamide according to claim 1 wherein the melamine cyanurate is particulate and at least 70 percent of the particles are smaller than 30 microns.

5. A flame retarded polyamide according to claim 1 wherein the polyol is monopentaerythritol or sorbitol.

6. A flame retarded polyamide according to claim 1 which additionally contains an acid derived from phosphorus in the weight ratio of from two to 20 parts for each 1000 parts of polyamide, the acid being calculated as orthophosphoric acid.

7. A flame retarded polyamide according to claim 6 wherein the acid derived from phosphorus is orthophosphoric acid, metaphosphoric acid, pyrophosphoric acid, phosphorous acid, hypophosphorous acid, or a mixture of two or more such acids.

8. A method of improving the flame retardancy and drip resistance of polyamides which comprises adding to at least one polyamide an amount of a mixture of melamine cyanurate and a polyol having at least four hydroxy groups sufficient to reduce the combustibility of the polyamide.

9. A method according to claim 8 wherein an acid derived from phosphorus is added to the polyamide to limit the polyamide chain length during the hydrolytic condensation of monomers to form the polyamide.

10. A method according to claim 9 which comprises adding an acid derived from phosphorus to the polyamide to augment the phosphorus acid content.

11. A method according to claim 8 wherein the polyamide is polyamide-11 or polyamide-12 obtained by polymerizing monomer in the presence of dodecanedioic acid.

12. A method according to claim 8 wherein the mixture contains more melamine isocyanurate than polyol.

13. A method according to claim 8 wherein the ratio of melamine isocyanurate to polyol in the mixture is from about two to ten.

14. A method according to claim 8 wherein the ratio of melamine isocyanurate to polyol is from about five to eight.

* * * * *